United States Patent
Knox

(10) Patent No.: US 7,908,587 B1
(45) Date of Patent: Mar. 15, 2011

(54) IO UPDATE TIME BASED CONDITIONAL STATEMENT EVALUATION

(76) Inventor: Lee B. Knox, Bethel Park, PA (US)

( * ) Notice: Subject to any disclaimer, the term of this patent is extended or adjusted under 35 U.S.C. 154(b) by 1218 days.

(21) Appl. No.: 11/520,375

(22) Filed: Sep. 13, 2006

(51) Int. Cl.
*G06F 9/45* (2006.01)

(52) U.S. Cl. ...................................................... 717/117
(58) Field of Classification Search .................... 717/117
See application file for complete search history.

(56) References Cited

U.S. PATENT DOCUMENTS

| | | | |
|---|---|---|---|
| 6,275,223 B1 * | 8/2001 | Hughes | 715/751 |
| 6,785,850 B2 * | 8/2004 | Dzoba et al. | 714/46 |
| 2007/0288885 A1 * | 12/2007 | Brunel et al. | 717/104 |

* cited by examiner

*Primary Examiner* — John Chavis
(74) *Attorney, Agent, or Firm* — Mark Levy; David L. Banner; Hinman, Howard & Kattell, LLP

(57) ABSTRACT

A method for a system control to automatically provide highly reliable calculations and decisions based on information from sources of input whose timing is less than reliable. With application of the method in a familiar environment, the program optimally and automatically suspends the execution of decisions or calculations until such time as a reliable set of input conditions can be confirmed. The method allows the use of existing computer language constructs with no need to address time-lagging, random input or intermittent device operation. With the use of the method a system automatically gains high reliability.

15 Claims, 3 Drawing Sheets

```
       205      210          215
         ↘       ↘       ⌒‾‾‾‾‾‾
        WaitFor ( 10, Value == 4 ) {
             code segment    ～ 220
           } else {
             code segment    ～ 225
        }

230          235          240
               ↘            ↘       ⌒‾‾‾‾‾‾‾‾‾
        WaitForTolerance ( 10, Value, 10, 1, 1 ) {
             code segment  ～ 245
           } else {
             code segment  ～ 250
        }
       255       260
         ↘    ⌒‾‾‾
        if ( Value == 4 ) {
             code segment  ～ 265
           } else {
             code segment  ～ 270
        }
```

Figure 2

IO UPDATE TIME BASED CONDITIONAL STATEMENT EVALUATION

FIELD OF THE INVENTION

The present invention relates to control systems and more particularly preventing the use of out-of-date system variables in control systems by automatically suspending calculations and decisions for as long as the time-stamp on the system variable is older than the time stamp of the initially attempted calculation or decision.

BACKGROUND OF THE INVENTION

One of the most important aspects of a system controller is the accuracy with which it makes its decisions based on its programming. It is not unusual for a system designer to over design hardware and software to attempt to create a very reliable overall system operation. Certainly, a reliable system is a necessity when the cost of the materials and the cost of equipment downtime are high.

Due to the nature of computer systems that interface with electrical inputs, however, errors do occur in reading data especially in larger more complex systems. A non-responsive or marginally operable device in the system can have relatively catastrophic effects if used for control functions. Such errors can be especially costly if the condition is not detected and there is no method for notice, corrective action, or prevention. Faulty decisions or calculations can be disruptive to business and designing for more reliability can be cost prohibitive.

The field of control systems is no exception to the general principles described above. Errors in controllers or costly equipment designs are not desirable.

Needless to say it is likely that the manufacturers of control system equipment would like to reduce cost and complexity and increase reliability.

It would therefore be advantageous to provide an automated system that can automatically compensate, report, or perform corrective action due to missing data readings, out of range readings, or failed operation of a system input.

It would further be advantageous to provide such a system with a standard user interface, such as a compiled language that includes the reliability of the invention without the need for elaborate programming.

It would further be advantageous to provide an adjustment mechanism to easily define the error response, corrective actions, time of detection behavior of the system without the need for extensive personnel training or spending time performing detailed programming steps.

SUMMARY OF THE INVENTION

The present invention is a method and apparatus for providing reliable system operation in the presence of intermittent, unreliable, or temporarily unavailable signal value updates or hardware in control system equipment. The inventive method suspends the act of calculation and decision making until all independent variables are known to have been updated. This method is generally applied in an environment that has a need for high productivity and reliability when implementing new objectives. As a result of the invention, control reliability is substantially improved and productivity is enhanced.

BRIEF DESCRIPTION OF THE DRAWINGS

A complete understanding of the present invention may be obtained by reference to the accompanying drawings, when considered in conjunction with the subsequent detailed description, in which:

FIG. 2 depicts three exemplary computer programming constructs for use in a programming environment containing the inventive methods.

DETAILED DESCRIPTION OF THE PREFERRED EMBODIMENT

Generally speaking, the preferred embodiment is a computer program for providing accurate results during automated system control (hereinafter referred to as the executive) from updated devices and inputs before an attempted statement evaluation. System control is based on input signal readings and/or other information sources that may or may not provide reliable updates to the system. Control system methods relating to the present invention enable the executive to automatically suspend calculations or decision making (hereinafter referred to as statement evaluation) until the input devices provide reliable update readings for the signals on which the statement evaluation depends.

Figure 1:
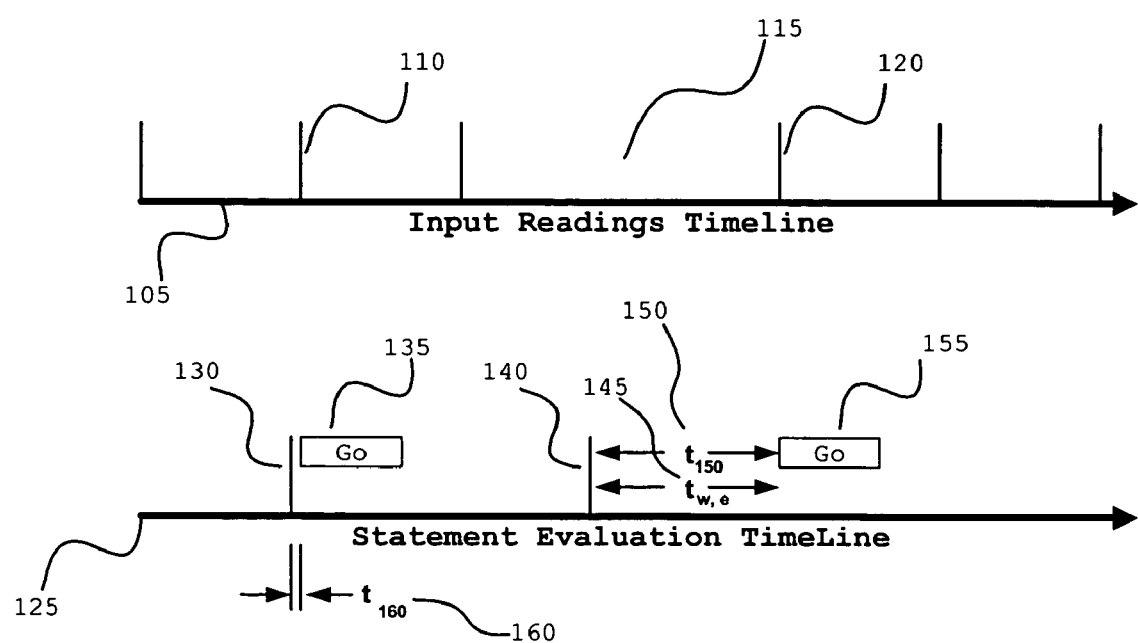
FIG. 1 is a diagram of a control system's input or device read-update timeline and a statement evaluation timeline in a system containing the inventive method.

Referring now to FIG. 1, there is shown a timeline diagram 105 of control system input readings at timestamp references 110, 115 and 120. Readings from the control system are generally timetagged at the actual time of reading but may be timetagged with altered times to account for customized aspects of system design. A skipped but scheduled reading 115 is depicted by the absence of a tick mark on the timeline. Readings 110 and 120 can be implemented using an event, arbitrary or periodic basis wherein a change in the state of the input readings causes an update to the executive. Readings 110 and 120 may occur at any time on the time line but are shown as regular and repetitious on FIG. 1.

Timeline 125 depicts the timeline of statement evaluation in the executive. Ticks 130 and 140 depict when the executive initially encounters the programming statements that require statement evaluation. The statement evaluation is delayed by time intervals 160 and 150 while readings 110 and 120 from the control system respectively are communicated to the executive. Executions 135 and 155 do not occur until the executive recognizes that readings 110 and 120 are received respectively, and have time stamps after the time stamps of the initial statements 130 and 140, respectively. Transport delays (not shown) between the system inputs and the calculation and decision making process do not affect the integrity of the method since the executive verifies that the time stamp of reading 110 and 120 is greater than that of initial statements 130 or 140, respectively.

A warning is issued by the executive at $T_w$ 145 if the time $T_{150}$ 150 exceeds a predetermined time interval $T_w$. The time interval $T_w$ can be specified separately or in common for each signal in the system. The contents of the warning message assist operators of equipment or the executive itself to take action to correct or compensate for the situation that caused the missing input reading 115.

An error is issued by the executive at time interval $T_e$ 145. The error time is specified separately or in common for each signal in the system. The error response of the system is defined by the executive and includes abort sequence, notification, and/or any other appropriate response by the system.

Referring now to FIG. 2, there are shown exemplary statements that affect program flow. The "WaitFor" statement 205 is a construct designed to provide a convenience function for waiting for a particular condition to occur while providing a convenient method to specify what will happen if the condition 215 is or is not satisfied within time 210. Exemplary evaluation construct 215 "Value==4" may be of any complexity including tests for more than one variable and/or any type of conditional. Statement evaluation of 215 by the executive is delayed until the input signal value's time stamp is chronologically greater than the time at which the executive initially encounters the statement. By delaying the evaluation of 215 in this fashion, the accuracy of the evaluation is ensured to represent an accurate state of the real world inputs. Upon successful evaluation of 215 where "Value" is identically equal to "4," code segment 220 will execute and code segment 225 will be skipped. If the time specified in 210 is exceeded and "Value" does not identically equal "4," code segment 220 is skipped and code segment 225 is executed.

The "WaitForTolerance" statement 230 is a construct designed to provide a convenience function for waiting for the signal depicted as "Value" 240 "Value, 10, 1, 1" to have a numerical value of between 9.0 and 11.0 while providing a convenient method to specify what will happen if the condition 240 is or is not satisfied within time 235. Statement evaluation 240 by the executive is delayed until the input signal value's time stamp is chronologically greater than the time at which the executive initially encounters the statement. By delaying the evaluation of 240 in this fashion, the accuracy of the evaluation is ensured to represent an accurate state of the real world inputs. Upon successful evaluation of 240 where "Value" is numerically between 9.0 and 11.0 code segment 245 will execute and code segment 250 will be skipped. If the time specified in 235 is exceeded and "Value" is not numerically between 9.0 and 11.0 code segment 245 is skipped and code segment 250 is executed.

The "if" statement 255 is a construct designed to provide a convenience function for evaluating whether a particular condition exists while providing a convenient method to specify what will happen if the condition 260 is or is not met. Exemplary evaluation construct 260 "Value==4" may be of any complexity including tests for more than one variable and/or any type of conditional. Statement evaluation of 260 by the executive is delayed until the input signal value's time stamp is chronologically greater than the time at which the executive initially encounters the statement 255. By delaying the evaluation of 260 in this fashion, the accuracy of the evaluation is ensured to represent an accurate state of the real world inputs. Upon successful evaluation of 260 where "Value" is identically equal to "4" code segment 265 will execute and code segment 270 will be skipped. Upon successful evaluation of 260 where "Value" is not identically equal to "4," code segment 270 will execute and code segment 265 will be skipped.

Figure 3:
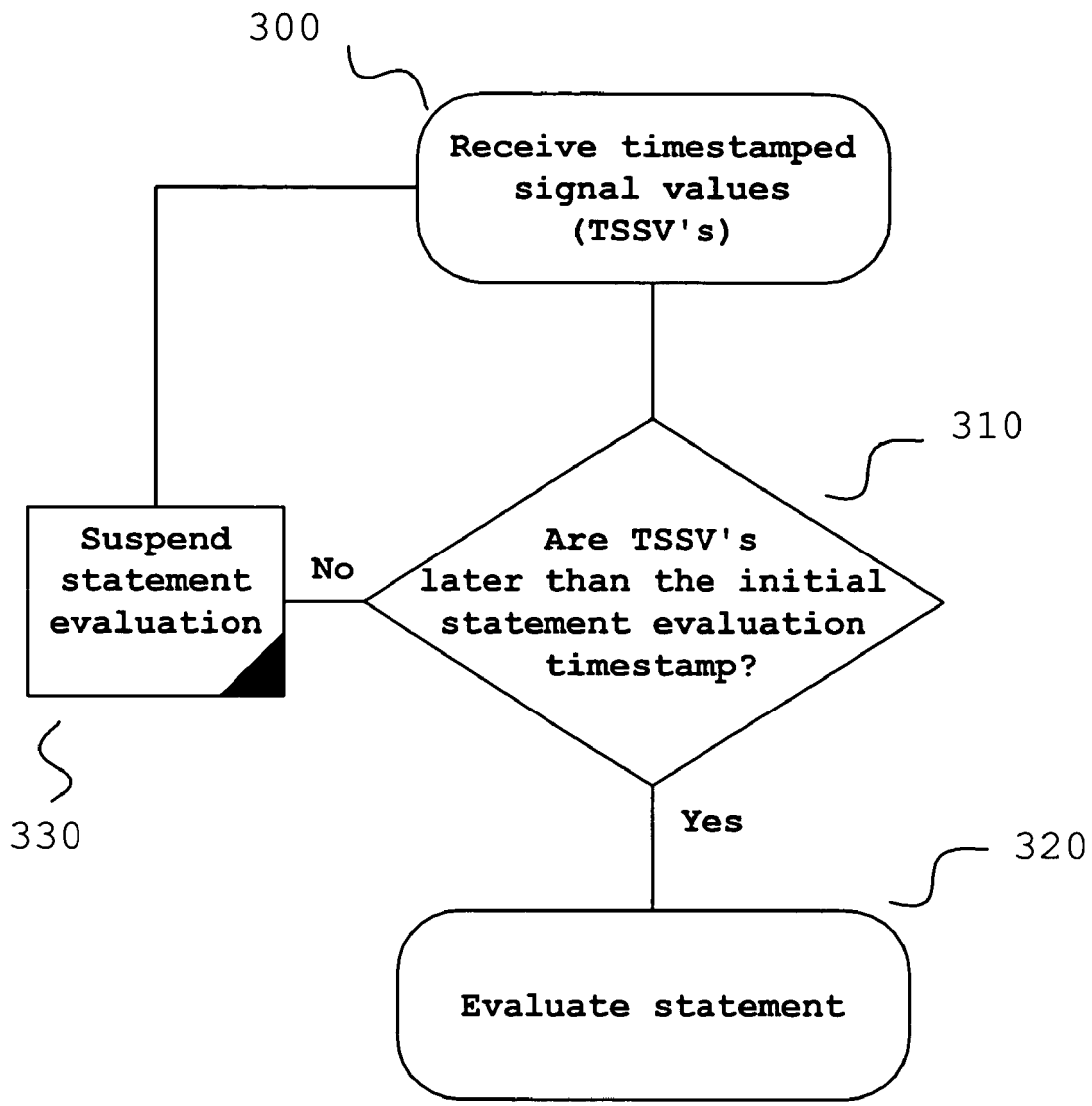
FIG. 3 depicts the executive function and is a flow chart of system operations in accordance with the present invention.

Referring now to FIG. 3, there is shown an exemplary program flow diagram. Event 300 represents the receipt of signal values and time stamped signal values (TSSV's). Processing of the event would include retaining the value and time stamp in storage such as RAM, database, or other media; not shown. Decision 310 depicts the function of testing the time stamps to ensure that the signal value readings are after the initial encounter of the subject statement evaluation. Process 330 represents the suspension of the statement evaluation. Event 320 represents the process of evaluating the statement when the TSSVs are known to be later than the initial encounter time of statements exemplified by the entirety of FIG. 2.

Since other modifications and changes vary to fit particular operating requirements and environments will be apparent to those skilled in the art, this invention is not considered limited to the examples chosen for purposes of this disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for suspending statement evaluation in a control system, the steps comprising:

a) providing timestamped signal values associated with control system inputs;

b) retaining said values and timestamp information;

c) retaining the timestamp of the initial encounter of a statement evaluation;

d) continuously, arbitrarily, or periodically comparing said timestamps of the signal values against said retained timestamp of the initial encounter of the statement evaluation; and e) suspending the statement evaluation until all timestamps of the signal values used in the statement evaluation are after the timestamp of the initial encounter of the statement evaluation.

2. The method of claim 1 wherein said statement evaluation is allowed immediately when the age of said timestamped signal values are less than a predetermined time.

3. The method of claim 1 where a signal that is numerically out of a specified range, or the signal value does not meet other deterministic criteria, prevents the timestamp for the signal value from updating.

4. The method of claim 1 where exceeding a time allotment during statement evaluation suspension for response from an input creates a condition that can include code flow redirection, a warning, or other corrective action.

5. The method of claim 1 where exceeding a time allotment during statement evaluation suspension for response from an input creates a condition that can include code flow redirection, an error, or other corrective action.

6. The method of claim 1 where signal values can be user input, financial data, stock market data, converted electrical readings, or any other representation of system states.

7. The method of claim 1 where one or more executives or statement evaluations occur simultaneously and independently.

8. The method of claim 7 where the suspension of an evaluation is only dependent on the inputs used in the suspended statement.

9. The method of claim 7 where statement evaluations that meet timestamp requirements are executed when others that don't meet their own timestamp requirements remain suspended.

10. An apparatus within a computer programming environment comprising a processor for executing various steps and a memory for retaining various values and timestamp information that enables suspending statement evaluation, the steps comprising:

a) providing timestamped signal values associated with control system inputs;
b) retaining said values and timestamp information;
c) retaining the timestamp of the initial encounter of a statement evaluation;
d) continuously, arbitrarily, or periodically comparing said timestamps of the signal values against said retained timestamp of the initial encounter of the statement evaluation; and
e) suspending the statement evaluation until all timestamps of the signal values used in the statement evaluation are after the timestamp of the initial encounter of the statement evaluation.

11. The apparatus of claim 10 wherein said constructs are "if", "WaitFor", "WaitForTolerance", mathematical functions or other programming constructs that requires statement evaluation.

12. The apparatus of claim 10 where signal values can be user input, financial data, stock market data, converted electrical readings, or any other representation of system conditions.

13. The apparatus of claim 10 where one or more executives or statement evaluations occur simultaneously and independently.

14. The apparatus of claim 13 where the suspension of an evaluation is only dependent on the inputs used in the suspended statement.

15. The apparatus of claim 13 where statement evaluations that meet timestamp requirements are executed when others that don't meet their own timestamp requirements remain suspended.

* * * * *